US009763435B2

(12) United States Patent
Schultz

(10) Patent No.: US 9,763,435 B2
(45) Date of Patent: Sep. 19, 2017

(54) FISHING ROD HOLDER

(71) Applicant: Dave Schultz, Beaver Dam, WI (US)

(72) Inventor: Dave Schultz, Beaver Dam, WI (US)

(73) Assignee: David Lee Schultz, Beaver Dam, WI (US)

( * ) Notice: Subject to any disclaimer, the term of this patent is extended or adjusted under 35 U.S.C. 154(b) by 181 days.

(21) Appl. No.: 14/951,115

(22) Filed: Nov. 24, 2015

(65) Prior Publication Data

US 2017/0142952 A1 May 25, 2017

(51) Int. Cl.
*A01K 97/10* (2006.01)

(52) U.S. Cl.
CPC .................... *A01K 97/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,967,427 A * | 7/1934 | Puckett | ................. | A01K 97/10 24/336 |
| 2,176,352 A * | 10/1939 | McHuron | ............... | A01K 97/10 248/156 |
| 2,542,253 A * | 2/1951 | King | ..................... | A01K 97/10 43/21.2 |
| 2,628,795 A * | 2/1953 | Diderrich | ............... | A01K 97/10 248/316.7 |
| 2,693,660 A * | 11/1954 | Nebergall | .............. | A01K 97/10 248/514 |
| 2,798,684 A * | 7/1957 | Walden | ................... | A01K 97/10 248/173 |
| 2,961,209 A * | 11/1960 | Willey | .................... | A01K 97/10 248/515 |
| 2,988,311 A * | 6/1961 | Bow | ...................... | A01K 97/10 248/122.1 |
| 4,594,805 A * | 6/1986 | McClelland | ........... | A01K 97/10 248/520 |
| 5,992,081 A | 11/1999 | Elkins | | |
| 6,253,484 B1 * | 7/2001 | O'Connor | .............. | A01K 97/10 248/213.2 |
| 6,421,948 B1 * | 7/2002 | Craig | ..................... | A01K 97/01 248/231.51 |
| 6,568,122 B1 * | 5/2003 | Smith | .................... | A01K 97/10 248/530 |
| 6,691,973 B1 * | 2/2004 | Barfield | ................. | A01K 97/10 248/156 |
| 6,857,608 B2 * | 2/2005 | Avinger | ................... | A01G 5/04 248/215 |
| 6,898,893 B1 | 5/2005 | Mukdaprakorn | | |
| 7,131,232 B1 | 11/2006 | Fecht | | |
| 8,240,079 B2 * | 8/2012 | Wakefield | .............. | A01K 97/10 43/21.2 |

(Continued)

*Primary Examiner* — Christopher P Ellis

(57) ABSTRACT

A device for holding a fishing rod, the device comprises a first clip member and a second clip member each with a clipping end and a handle end, the clip members are connected to each other by a pivot pin. The handle end of the first and second clip members comprise a vertical slot for receiving and holding the fishing rod. The device further comprise a resilient member disposed around the pivot pin, the resilient member comprise two opposite ends pressed against an inner surface of the first and second clip members, so as to clip on the device to a vertical surface of an object.

7 Claims, 7 Drawing Sheets

(56) References Cited

U.S. PATENT DOCUMENTS

| | | | |
|---|---|---|---|
| 9,072,287 B2 | 7/2015 | Holzer | |
| 2005/0005500 A1* | 1/2005 | Howley | A01K 97/10 43/21.2 |
| 2006/0196101 A1* | 9/2006 | Mrotek | A01K 97/10 43/21.2 |
| 2010/0269399 A1 | 10/2010 | Gordon | |
| 2014/0317990 A1 | 10/2014 | Spiegel | |
| 2014/0331543 A1* | 11/2014 | Hancock | A01K 97/01 43/17 |
| 2015/0201601 A1* | 7/2015 | Honermann | A01K 97/01 211/70.8 |

\* cited by examiner

FISHING ROD HOLDER

BACKGROUND OF THE INVENTION

A. Technical Field

The present invention generally relates to fishing equipment and fishing related accessories, more specifically relates to a portable device for holding and supporting fishing rods or tip downs.

B. Description of Related Art

Fishermen or people who indulge in fishing activity are typically required to carry out numerous other activities during fishing. These activities include, for example, baiting a hook, replacing or changing a lure, untangling the fishing line, removing a hook from a caught fish, releasing a fish, steering a boat, etc. Typically these activities require the fisherman to hold the rod in position while performing such activities. However, it is often difficult to hold the rod at a convenient angle in one hand while carrying out the aforementioned activities using the other hand.

Numerous fishing rod holders exists in the art, these holders typically require a specific type of rod for setting up tip downs and comprises a clamp or screw type mounting mechanism. Fishing rods are required to be mounted on different types of vertical surfaces including boat wall, pail, pier and the like. Therefore, there is a need in the art for fishing rod holders with a common mounting mechanism, which allows the holder to be mounted on different surfaces as discussed above.

Another limitation with the existing fishing rod holders is lack of strong holding of the fishing rod, especially during situations when a powerful strike by a fish will pull the entire fishing rod into the water which results in loss of expensive fishing equipment. For example, during ice fishing, a fisherman will occasionally leave an ice fishing hole unattended with the result that a powerful strike by a fish will pull the entire fishing rod into and through the hole so that the fishing rod is lost. Similarly, during open water fishing unattended fishing rod lying on a pier or extending from a boat may get pulled into the water body by the fish.

Therefore, there is a need in the art for a fishing rod holder which can be removably attached to different types of vertical surfaces and the fishing rod holder should also be able to prevent pulling in the entire fishing rod into the water by the fish.

SUMMARY OF THE INVENTION

The present invention relates to a device for holding a fishing rod, the device comprising: a first clip member and a second clip member connected to each other by a pivot pin, wherein the first and second clip members comprise a clipping end and a handle end; the handle end of the first and second clip members comprise a vertical slot for receiving and holding the fishing rod; and a resilient member disposed around the pivot pin, the resilient member comprise two opposite ends pressed against an inner surface of the first and second clip members, so as to clip on the device to a vertical surface of an object such as pail, pier and boat. Benefits also include, being able to see a strike from further distance, being able to fish while doing other tasks and spreading out multiple lines for ice fishing.

In an embodiment, the vertical slot of the first clip member comprise a rubber lining for holding the base portion of the fishing rod. The vertical slot of the second clip member comprise a plurality of segments defined by a plurality of flexible flaps allowing tip down of the fishing rod. The vertical slots of the first and second clip members are aligned to receive and hold the fishing rod. The clipping end further comprise one or more gripping members attached to the inner surface of the first and second clip members.

The device for holding a fishing rod can be clipped on to vertical surface of objects such as pail, pier and boat. The vertical slot of the second clip member comprising plurality of segments defined by flexible flaps prevents pulling in the fishing rod into the water as a result of powerful strike by the fish. Thus, the fishing rod holding device of the present invention prevents loss of expensive fishing equipment.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DIFFERENT VIEWS OF DRAWINGS

DETAILED DESCRIPTION OF DIFFERENT EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention discloses a device for holding a fishing rod. The fishing rod holding device is configured to easily mountable by clipping onto a vertical surface of an object such as a boat, pail, pier and the like. The device of the present invention allows tip down of fishing rod to indicate a bite by the fish at the hook end and prevents pulling in the entire fishing rod into the water during powerful strike by the fish, thus minimizing the loss of fishing equipment.

Figure 1:
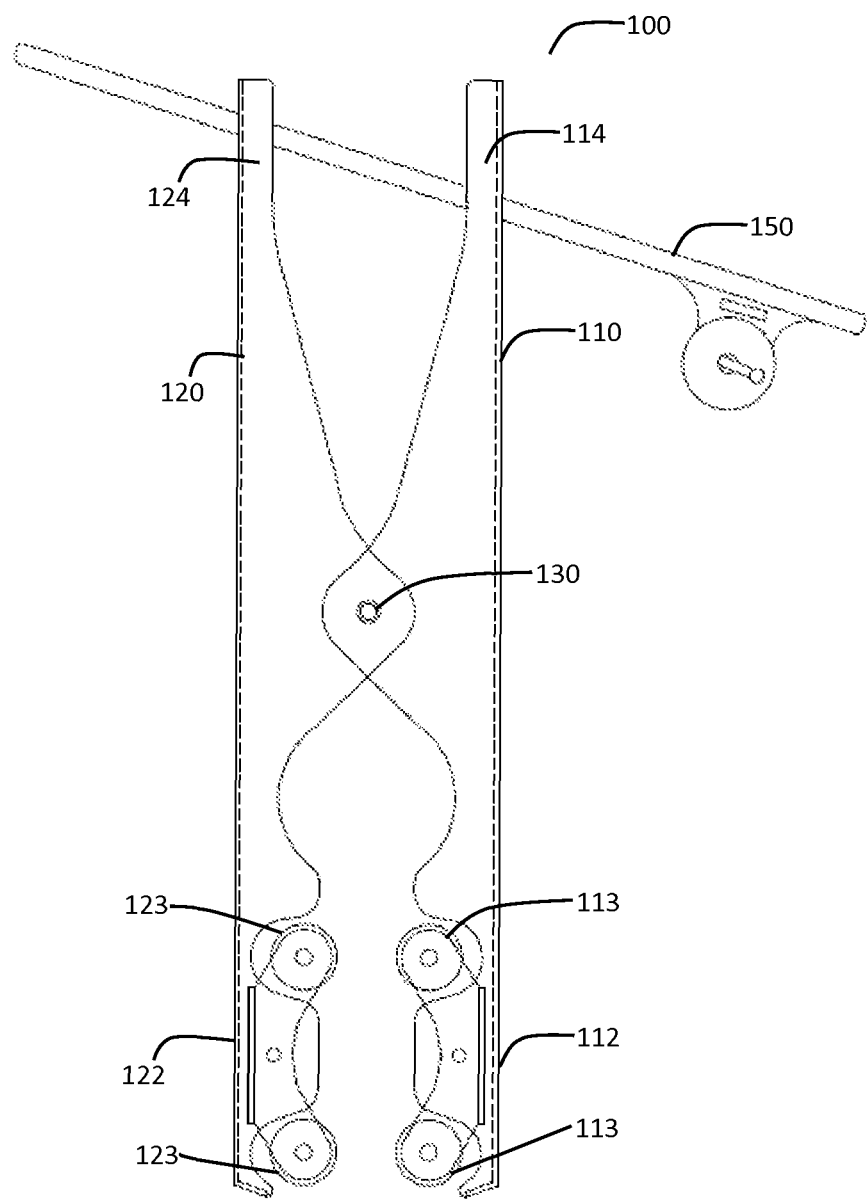
FIG. 1 is a side view of the device for holding a fishing rod.

FIG. 1 shows a side view of the device 100 holding a fishing rod 150. The device 100 comprises a first clip member 110 and a second clip member 120 connected to each other by a pivot pin 130. The first clip member 110 comprise a clipping end 112 and a handle end 114 and the second clip member 120 comprise a clipping end 122 and a handle end 124. The clipping ends 112, 122 further comprises a plurality of gripping members 113, 123 facing opposite to each other. The gripping members 113 and 123 disposed on the inner face of the clipping ends 112, 122, provides a means for firm attachment when the device 100 is clipped on to a surface such as a vertical wall of a pail.

Figure 2:
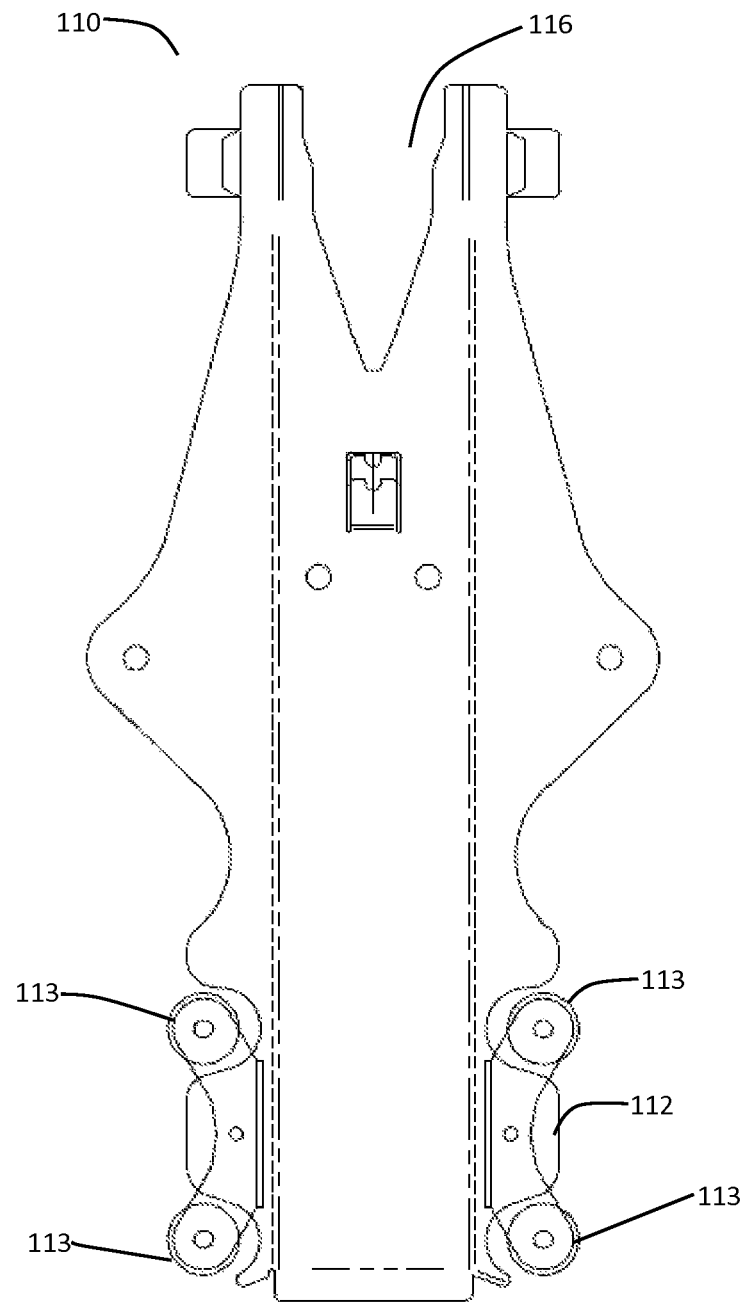
FIG. 2 is a front view of the first clip member.

FIG. 2 shows a front view of the first clip member 110 comprising a vertical slot 116 at the top configured to receive and hold the fishing rod, specifically to hold a portion near the handle of the fishing rod. In an embodiment, the vertical slot 116 comprises a V-shaped slot lined with a layer of a rubber material for holding the base portion of the fishing rod. The first clip member 110 further comprises a plurality of gripping members 113 at the clipping end 112. The first clip member 110 is also termed as back clamp or rear clip member as it is configured to hold the bottom segment of the fishing rod. The vertical slot 116 of the first clip member 110 has been designed to hold different types of fishing rods with varying thickness and shapes.

Figure 3:
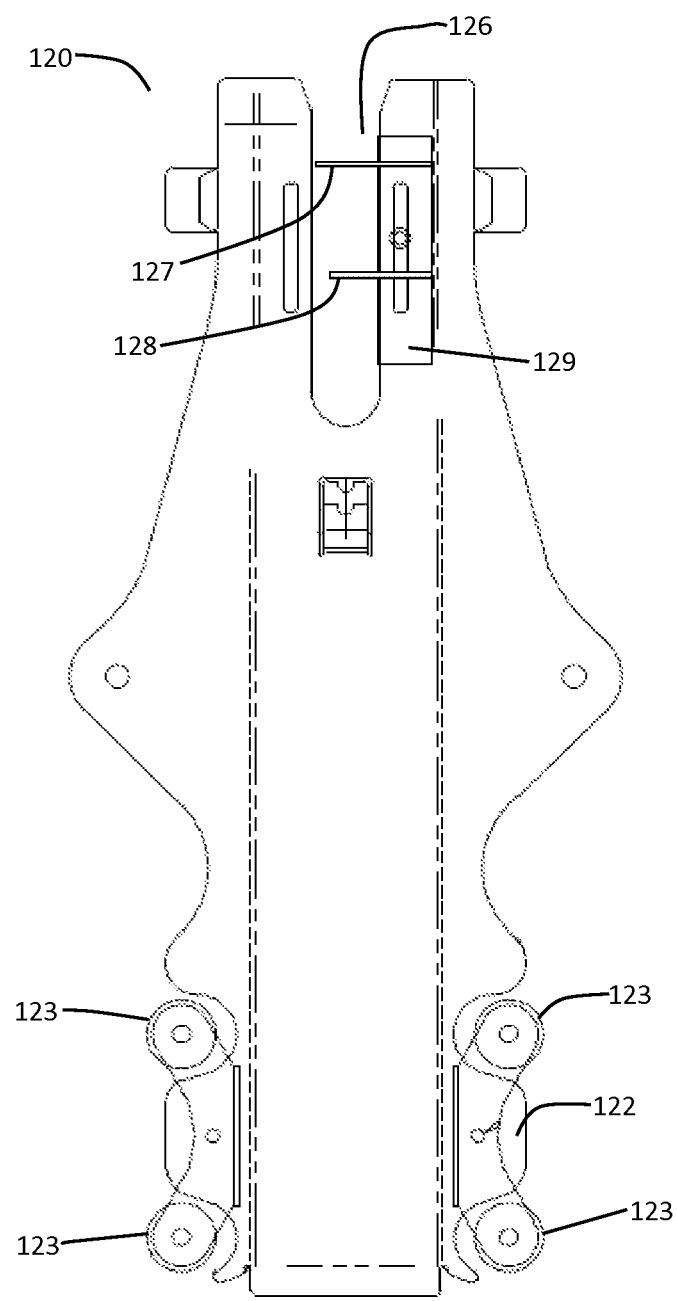
FIG. 3 is a front view of the second clip member according one embodiment of the present invention.

FIG. 3 shows a front view of the second clip member 120 comprising a vertical slot 126 at the top end configured to receive and hold the fishing rod, specifically to hold a portion away from the handle of the fishing rod. The second clip member 120 comprises a plurality of gripping members 123 at the clipping end 122. In an embodiment, the vertical slot 126 comprises a U-shaped slot configured to hold the portion towards the tapering end of the fishing rod. The vertical slot 126 of the second clip member 120 comprise a plurality of segments defined by nylon flaps 127, 128 horizontally extending from a nylon block positioned on one of the sides of the vertical slot 126. Different rod settings can be achieved by placing the fishing rod in the segments defined by the nylon flaps.

In an exemplary embodiment, the rod settings are defined as heavy, medium and light weight settings. In the heavy setting, the fishing rod can be placed on the upper nylon flap 127; for medium setting the fishing rod can be placed on the lower nylon flap 128; and for light weight setting, the fishing rod can be placed below the lower nylon flap 128. Using the nylon flaps 127, 128 horizontally extending from the nylon block, different type of rod settings suitable for different fishing conditions can be achieved.

Figure 4:
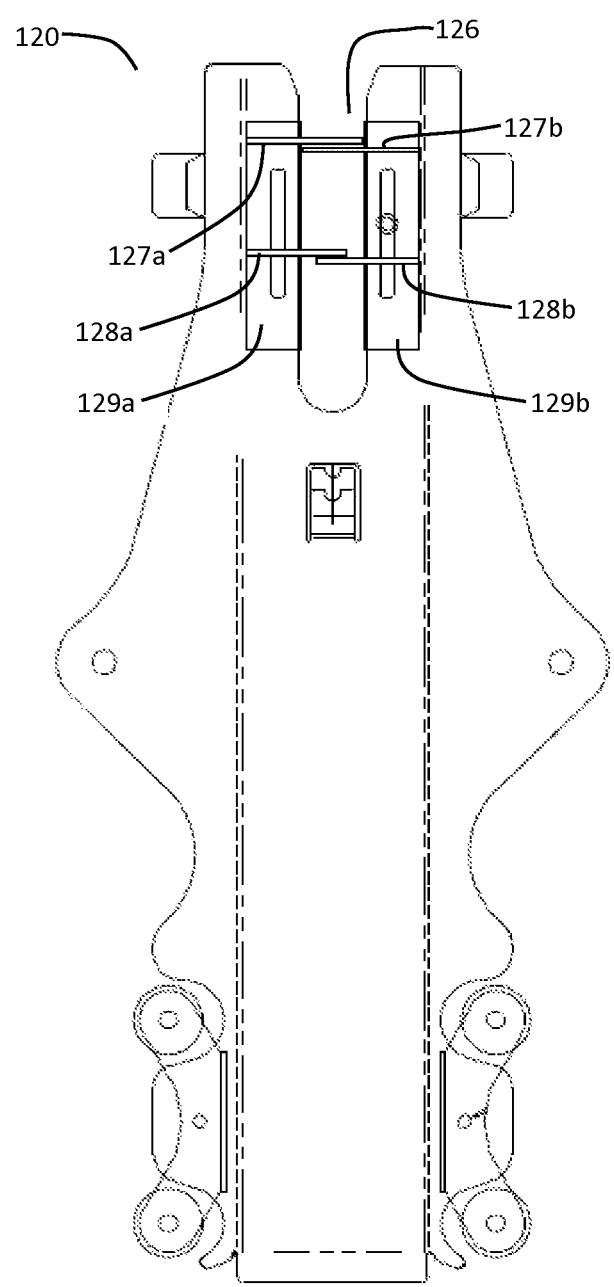
FIG. 4 is a front view of the second clip member according to a different embodiment of the present invention.

In another embodiment, the second clip member 120 may comprise overlapping nylon flaps horizontally extending from nylon blocks positioned on either side of the vertical slot 126 as shown in FIG. 4. The upper nylon flap comprise two flaps 127a, 127b extending from nylon blocks on either side of the slot 126, wherein tip of the flaps 127a, 127b substantially overlap with each other. Similarly, the lower nylon flap comprise two flaps 128a, 128b extending from either side of the slot 126, wherein tip of the flaps 128a, 128b substantially overlap with each other.

Figure 5:
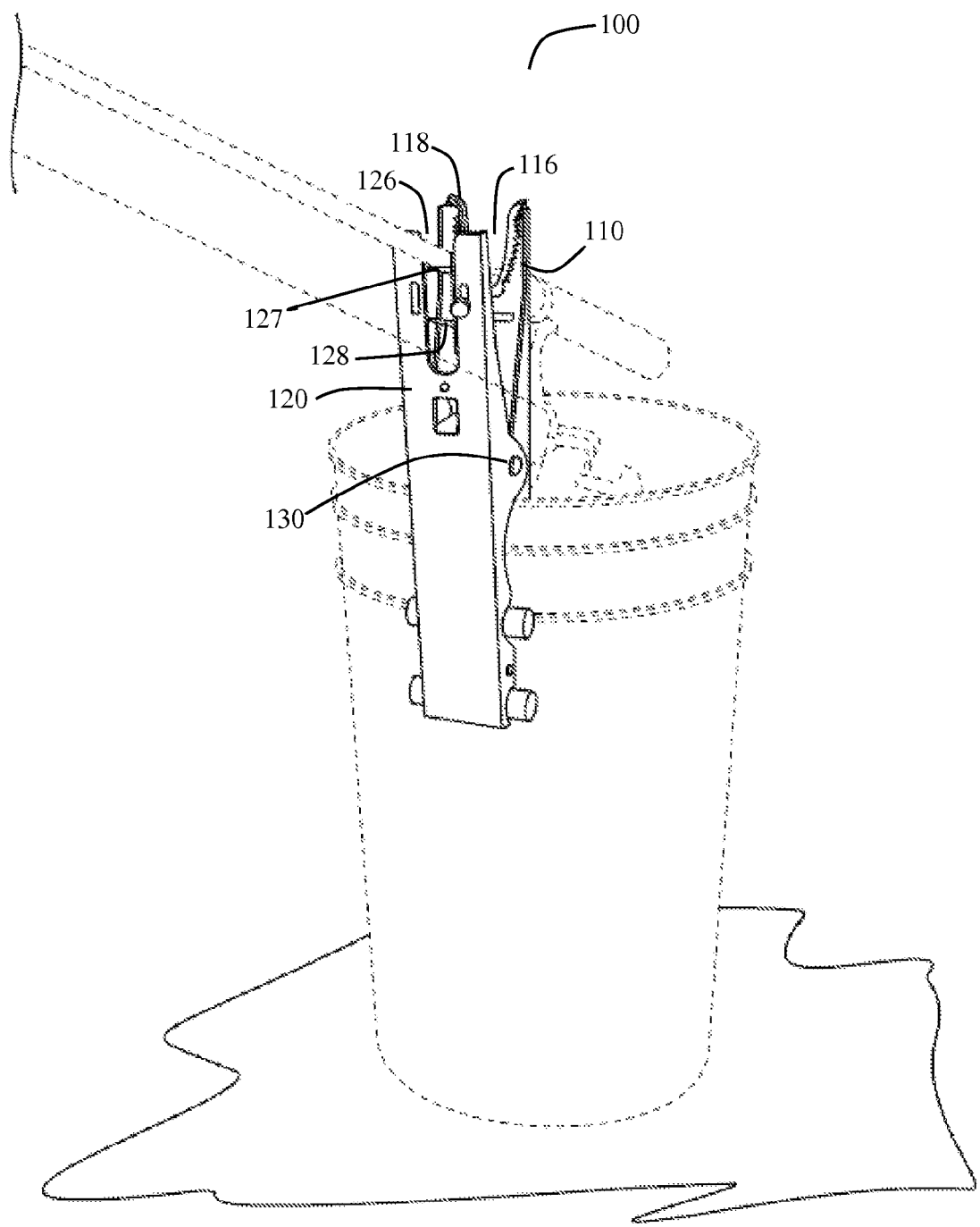
FIG. 5 is a front perspective view of the device holding a fishing rod with rod tip in a higher position.

FIG. 5 shows a front perspective view of the device 100 holding a fishing rod with rod tip in a higher position. The device 100 is clipped on to a vertical wall of a pail using the first clip member 110 and the second clip member 120 connected to each other by the pivot pin 130. The fishing rod is placed within the vertical slots 116, 126 of the first and second clip members 110, 120 respectively. The vertical slot 116 of the first clip member 110 comprise a layer of gripping means 118 on the inner surface for providing grip while holding the fishing rod. The vertical slot 126 of the second clip member 120 comprise a plurality of segments defined by nylon flaps 127, 128 extending from one or both sides of the slot 126. The fishing rod when placed on the vertical slots 116, 126 of the device 100, with the rod tip in a higher position, the leading end of the fishing rod rests on the nylon flap 127 of the vertical slot 126. The base portion of the fishing rod rests on the gripping means 118 of the vertical slot 116.

Figure 6:
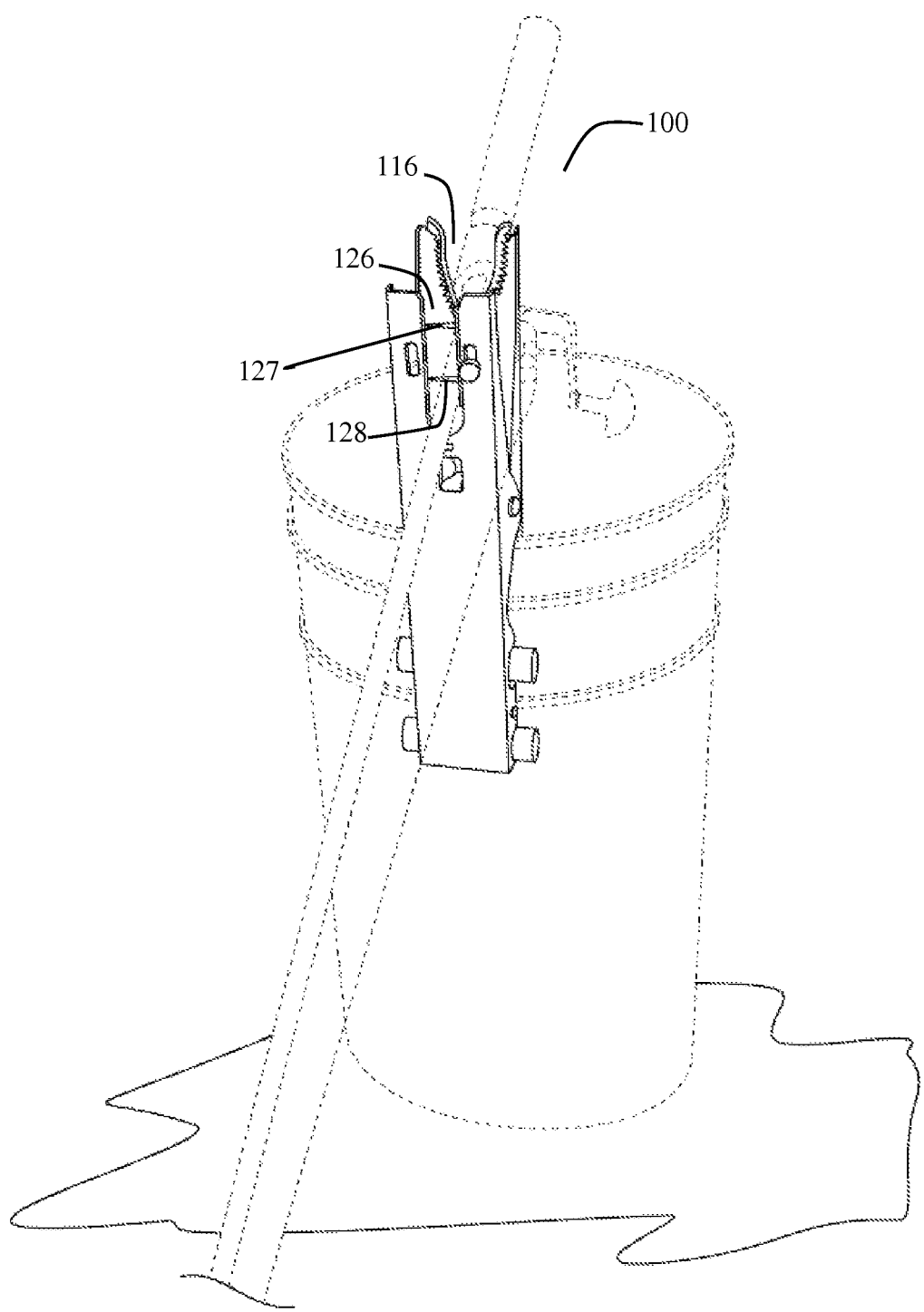
FIG. 6 is a front perspective view of the device holding the fishing rod with rod tip in a tip down position.

FIG. 6 shows a front perspective view of the device 100 holding a fishing rod with rod tip in a lower position or tip down position. The fishing rod when placed on the vertical slots 116, 126 of the device 100, comes to a tip down position when a fish bites the hook end. In a tip down position, the leading end of the fishing rod rests below the nylon flaps 127 or 128 extending from one or both sides of the vertical slot 126. The tip down position of the fishing rod indicates bite by a fish at the hook end. The vertical slots 116, 126 also prevents the base portion of the fishing rod to pass through thus preventing the entire fishing rod being pulled into water by the fish.

Figure 7:
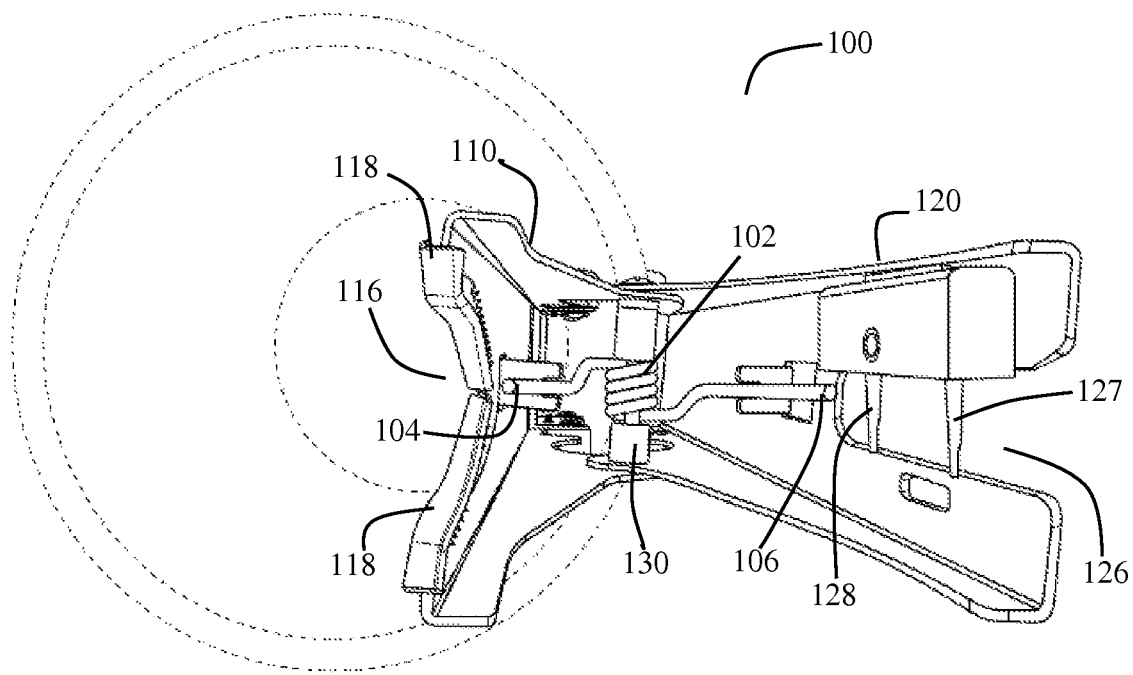
FIG. 7 is a top view of the device for holding the fishing rod.

FIG. 7 shows a top view of the device 100 being clipped on to a vertical surface of a pail. The device 100 further comprise a resilient member 102, such as a spring clip, disposed around the pivot pin 130, the resilient member 102 comprise two opposite ends 104, 106 pressed against an inner surface of the first and second clip members 110, 120 so as to clip on the device 100 to a vertical surface of an object such as pail, pier and boat. The vertical slot 116 of the first clip member 110 comprise a layer of gripping means 118, for example a rubber lining disposed on the edges of the vertical slot 116 for providing grip while holding the fishing rod. The vertical slot 126 of the second clip member 120 comprise a plurality of segments defined by nylon flaps 127, 128, which allows tip down of the fishing rod when a fish bites the hook of the fishing rod. The tip down position of the fishing rod indicates bite of the hook by the fish.

The device 100 for holding a fishing rod is versatile and can be readily clamped on to any vertical surface. For example, the device 100 can be clamped onto vertical surface of objects such as pail, pier, boat and hand rails. The present invention eliminates the need for screwing or clamping of the holder device to the surfaces including boat, pier and pail, thus providing easy mounting. The vertical slots 116, 126 of the first clip member 110 and the second clip member 120 comprising the plurality of segments defined by flexible flaps 127, 128 also prevents pulling in the fishing rod into the water, which might occur as a result of powerful strike by the fish. Thus, the fishing rod holding device 100 of the present invention prevents loss of expensive fishing equipment.

One of the numerous advantages of the present invention is the device 100 can be used with any fishing rod and does not require users to buy a specific rod type. The device 100 for holding fishing rod requires no preliminary mounting using screws or clamps, the device 100 can be easily clipped onto any vertical surface and also prevents pulling in of fishing rod into water by the fish. The device 100 is easily portable, made of metal or plastic and may further comprise predetermined rod settings suitable for different fishing conditions.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A device for holding a fishing rod, the device comprising:
   a first clip member and a second clip member connected to each other by a pivot pin, wherein the first and second clip members comprise a clipping end and a handle end;
   the handle end of the first and second clip members comprise a vertical slot for receiving and holding the fishing rod; and
   a resilient member disposed around the pivot pin, the resilient member comprise two opposite ends pressed against an inner surface of the first and second clip members, so as to clip on the device to a vertical surface of an object.

2. The device of claim 1, wherein the clipping end comprise at least one gripping member on the inner surface.

3. The device of claim 1, wherein the vertical slot of first clip comprise a rubber lining.

4. The device of claim 1, wherein the vertical slot of second clip comprise a plurality of segments defined by a plurality of flexible flaps allowing tip down of the fishing rod.

5. The device of claim 1, wherein the resilient member comprise a spring clip.

6. The device of claim 1, is made of plastic or metal.

7. The device of claim 1, wherein the object comprises pail, pier and boat.

* * * * *